US007581212B2

(12) United States Patent
West et al.

(10) Patent No.: US 7,581,212 B2
(45) Date of Patent: Aug. 25, 2009

(54) METHOD AND SYSTEM FOR CONVERSION OF AUTOMATION TEST SCRIPTS INTO ABSTRACT TEST CASE REPRESENTATION WITH PERSISTENCE

(75) Inventors: John Randall West, Sunnyvale, CA (US); Satheesh Kumar Madathiparambil Gopinathan Nair, Santa Clara, CA (US); Andrew Hyun-Chul Kim, Redwood City, CA (US)

(73) Assignee: Symphony Services Corp., Palo Alto, CA (US)

( * ) Notice: Subject to any disclaimer, the term of this patent is extended or adjusted under 35 U.S.C. 154(b) by 386 days.

(21) Appl. No.: 10/756,894

(22) Filed: Jan. 13, 2004

(65) Prior Publication Data

US 2005/0160322 A1 Jul. 21, 2005

(51) Int. Cl.
*G06F 9/45* (2006.01)
*G06F 9/44* (2006.01)
(52) U.S. Cl. .................. 717/136; 717/104; 717/115; 717/124
(58) Field of Classification Search .................. 717/131, 717/144, 147, 115
See application file for complete search history.

(56) References Cited

U.S. PATENT DOCUMENTS

| 5,600,789 | A  | * | 2/1997  | Parker et al. .................. 714/38 |
| 5,892,947 | A  |   | 4/1999  | DeLong et al. |
| 6,505,342 | B1 | * | 1/2003  | Hartmann et al. ........... 717/104 |
| 6,609,248 | B1 | * | 8/2003  | Srivastava et al. ........... 717/147 |
| 6,698,012 | B1 | * | 2/2004  | Kossatchev et al. ......... 717/126 |
| 6,976,246 | B1 | * | 12/2005 | Rosaria et al. .............. 717/131 |
| 2004/0107415 | A1 | * | 6/2004 | Melamed et al. ............ 717/124 |
| 2004/0194072 | A1 | * | 9/2004 | Venter ........................ 717/140 |

FOREIGN PATENT DOCUMENTS

EP 0869433 7/1998

OTHER PUBLICATIONS

"WinRunner 7.0 Tutorial", Mercury Interactive Corporation, 2000 (97 pages). Online retrieved at <www.csee.usf.edu/~njayacha/web/edu/automation/wr_tut.pdf>.*

(Continued)

*Primary Examiner*—Tuan Q Dam
*Assistant Examiner*—Thuy Dao
(74) *Attorney, Agent, or Firm*—Goodwin Procter LLP; Paul Davis

(57) ABSTRACT

A general technique using semantic analysis is provided that can be used for converting a specific automation test script (and its underlying test case), generated from generally available or proprietary test automation tools, into an abstract test case representation. The abstract test case representation is based on a test case representation model that includes application states (state information), external interaction sequences (control flow information) and input data. The abstract representation in essence provides a platform independent representation of test cases. An application object model provides the representational capabilities required for capturing structural and behavioral properties of the application under test. The abstract test case representation can be validated against and further enriched by specific object information from an application metadata repository. Finally, object information and input data can be separated from control flow information to provide automatic parameterization of the test script.

47 Claims, 9 Drawing Sheets

OTHER PUBLICATIONS

"A Visual Test Development Environment for GUI Systems", Ostrand et al., Mar. 1998, pp. 82-92. Online retrieved at <http://delivery.acm.org/10.1145/280000/271793/p82-ostrand.pdf>.*

"Tools and Automation: Logical Capture/Replay", M. Silverstein, Dec. 2003, pp. 36-43. Online retrieved at <http://www.silvermark.com/Library/publications/articles/sqe_logical_capture_replay.pdf>.*

Wood L: "Programming the Web: the W3C DOM specification" IEEE Internet Computing, vol. 3, No. 1, Jan. 1999, pp. 48-54.

Klein M: "Interpreting XML documents via an RDF schema ontology" Proceedings. 13th International Workshop on Sep. 2-6, 2002, Piscataway, NJ, USA, IEEE Sep. 2, 2002, pp. 1-5.

J. Ryser, M. Glinz: "SCENT: A method employing scenarios to systematically derive test cases for system test" Technical Report, Institut for Informatik, Mar. 2003, pp. 1-106, University of Zurich abstract.

* cited by examiner

METHOD AND SYSTEM FOR CONVERSION OF AUTOMATION TEST SCRIPTS INTO ABSTRACT TEST CASE REPRESENTATION WITH PERSISTENCE

BACKGROUND OF THE INVENTION

1. Field of the Invention

This invention relates generally to methods and systems for managing test cases, and more particularly to methods and systems for transforming test cases that are converted to an abstract representation.

2. Description of the Related Art

Creation and maintenance of proper test cases that provide adequate coverage and effectiveness in terms of uncovering bugs is a very challenging and resource intensive activity. The current approaches to test case management do not ensure reusability and maintainability of test cases. This results in repeating cycles of creation of test cases from version to version, environment to environment and platform to platform.

Current approaches to test case creation are either manual programming in one of many programming languages or recording test cases using record/playback systems. In both approaches, the test cases are created and managed as sequence of programming language statements known as test scripts. These test scripts are then managed through a set of utilities which treats them like files on storage disks.

One of the disadvantages of managing test cases this way is that they are tied to a target execution environment. Different test execution environments support different scripting languages and the same operation will be represented by different statements in these environments. If the enterprise software company decides to change the test execution system, all their test cases have to be recreated in the new environment.

Considering the substantial investments required by such an endeavor, many software development organizations will be tied to a single vendor of test execution environments. In addition, testing enterprise applications in customized environments also presents a challenge. Most of the enterprise applications are substantially customized in their customer environments. Testing the application against a standard test suite can ensure that the application has not been altered in undesired ways. Providing such test cases can reduce the rollout time for such applications at customer sites as well as improve the efficiency of field support activities. The inability of customers to support the same test execution environments as that of the software provider makes this impossible.

Enterprise applications require testing across a large number of platforms. These platforms involve a technology stack of operating systems, database systems and other applications that they work with. For efficient management of test cases, the scripts shall not be tied to any specific platform.

Almost all enterprise applications support internationalization and localization, it is important that the same tests can be executed with data sets in different languages and different locale formats. In order to achieve this, the data sets have to be separated from the test scenarios. When test cases are managed as scripts, this requires one to parameterize the scripts manually. This again involves substantial investments of highly skilled labor.

The test cases that are parameterized, as described in the previous paragraph, are also required to ensure adequate coverage. The same test scenario must be executed with different datasets, different boundary condition values for example, to guarantee proper functioning of the system, When an enterprise application moves from one release to the next, even subtle changes such as layout changes to user interfaces can result in changes to the test cases. Lack of abstractions within the test case representation using scripts substantially decreases the reusability of test cases and increases maintenance costs.

All enterprise applications have functionality that is repeated in many different contexts. The ability to created test cases in a modular fashion improves their reusability. The test cases for the same functionality may be reused in any test scenarios that uses the same functionality. Most scripting environments provide modularity through support of procedures. Such procedural abstractions are limited in their ability because the test cases not only encompass the procedural abstraction but also the data abstraction. Appropriate abstractions within the test case management systems are to be devised so that test cases can be built in a modular fashion and recombined efficiently and effectively.

There is a need for improved systems and methods for converting automation test scripts into an abstract test case representation.

SUMMARY OF THE INVENTION

Accordingly, an object of the present invention is to provide methods and systems for converting a specific automation test script into an abstract test case representation.

Another object of the present invention is to provide methods and systems that use semantic analysis for converting a specific automation test script (and its underlying test case), generated from generally available or proprietary test automation tools, into an abstract test case representation.

Another object of the present invention is to provide methods and systems for converting a specific automation test script into an abstract test case representation, where the abstract test case representation is based on a test case representation model that includes application states (state information), external interaction sequences (control flow information) and input data.

A further object of the present invention is to provide methods and systems for converting a specific automation test script into an abstract test case representation, with the abstract representation providing a platform independent representation of test cases.

Yet another object of the present invention is to provide methods and systems for converting a specific automation test script into an abstract test case representation, where the abstract test case representation is based on a test case representation model that provides the representational capabilities required for capturing structural and behavioral properties of the application under test.

Still another object of the present invention is to provide methods and systems for converting a specific automation test script into an abstract test case representation, and the abstract test case representation is validated against and further enriched by specific object information from an application metadata repository.

Another object of the present invention is to provide methods and systems for converting a specific automation test script into an abstract test case representation, where object information and input data are separated from control flow information to provide automatic parameterization of the test script.

These and other objects of the present invention are achieved in a method for transforming test cases that imports test cases written in one or more scripting languages. Test cases are converted to an abstract representation that includes an application state, external interaction sequences and input data. Abstract representations of test cases is stored in a database system.

In another embodiment of the present invention, a system for transforming test cases includes a processor for importing test cases written in one or more scripting languages. Logic is provided for converting test cases to an abstract representation that includes application state, external interaction sequences and input data; and a database that stores abstract representation of test cases.

In another embodiment of the present invention, a computer system includes a processor coupled to a memory. The memory stores program instructions executable by the processor for converting test cases to an abstract representation that includes application state, external interaction sequences and input data. A database stores abstract representation of test cases.

In another embodiment of the present invention, a carrier medium includes program instructions for converting test cases to an abstract representation that includes application state external interaction sequences and input data. A database stores program instructions of abstract representations of the test cases.

BRIEF DESCRIPTIONS OF THE DRAWINGS

DETAILED DESCRIPTION OF THE PREFERRED EMBODIMENT

Figure 1:
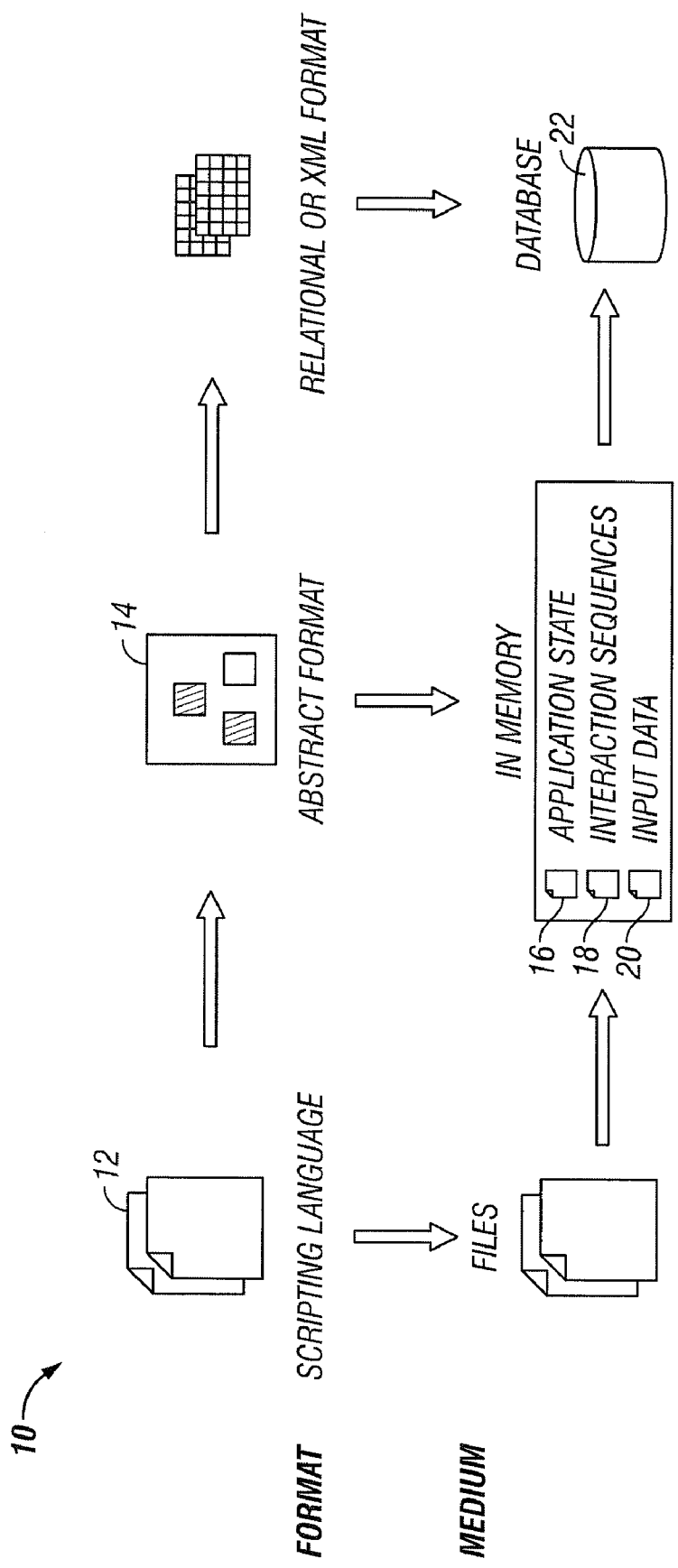
FIG. 1 is a schematic diagram illustrating one embodiment of a test case transformation embodiment of the present invention.
Figure 2:
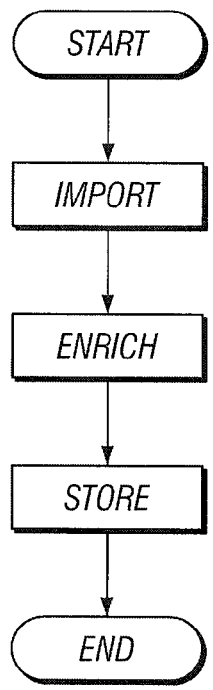
FIG. 2 is a general flowchart illustrating the FIG. 1 embodiment.

Referring to FIGS. 1 and 2, one embodiment of the present invention is a system 10 and method for transforming test cases. Test cases 12 are imported that are written in one or more scripting languages. Test cases 12 are then converted to an abstract representation 14 which includes one or more application states 16, external interaction sequences 18 and input data 20. Abstract representations 14 are stored in a database system 22. A variety of different database systems 22 can be utilized including but not limited to, a relational database management system, an XML database management system, and the like.

Figure 3:
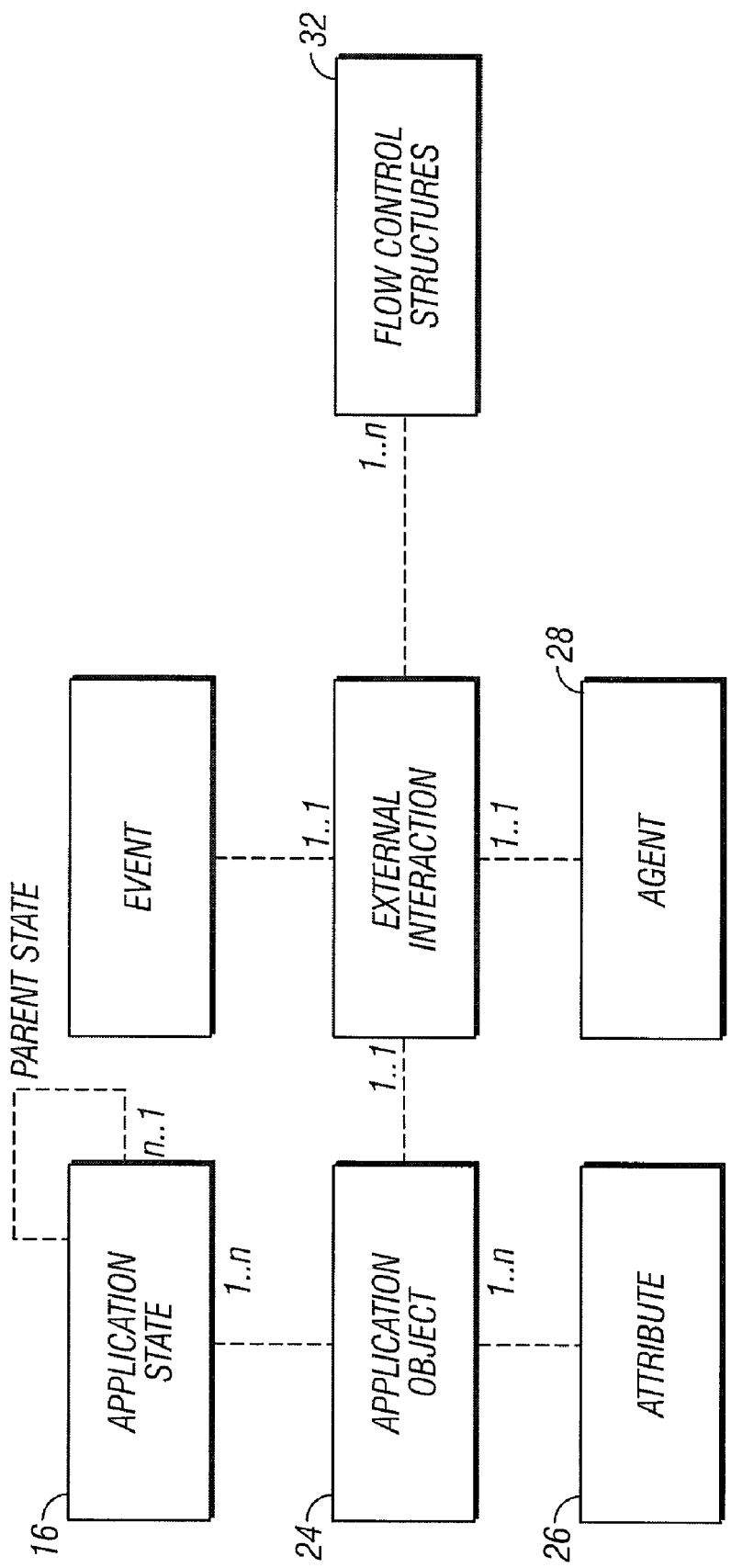
FIG. 3 is a schematic diagram illustrating the relationship of application states and interaction representation utilized in one embodiment of the present invention.

An application state 16 represents a runtime snapshot of an application under test which defines the context of external interaction. In one embodiment, illustrated in FIG. 3, application state 16 is a set of application objects 24, such as a web page or a window control or an account object, for example. Each application object 24 is associated with a set of attributes 26 and their values. For example, a web page can have an attribute 26, called url, which contains the Uniform Resource Locator (URL) corresponding to the current web page, and an attribute 26, called title, which contains the title of the current web page. In one embodiment, the set of applications states 16 is represented in the test case 12 and are arranged in a hierarchical manner.

Scripting languages utilized can be typed or untyped programming languages used for recording or authoring test cases. External interaction sequences 18 can represent events invoked by external agents 28 on application objects 24. External agents 28 can be either human agents or other software agents. Interaction sequencing can include flow control structures 32 for capturing sequential, concurrent, looping, conditional interactions, and the like.

Figure 4:
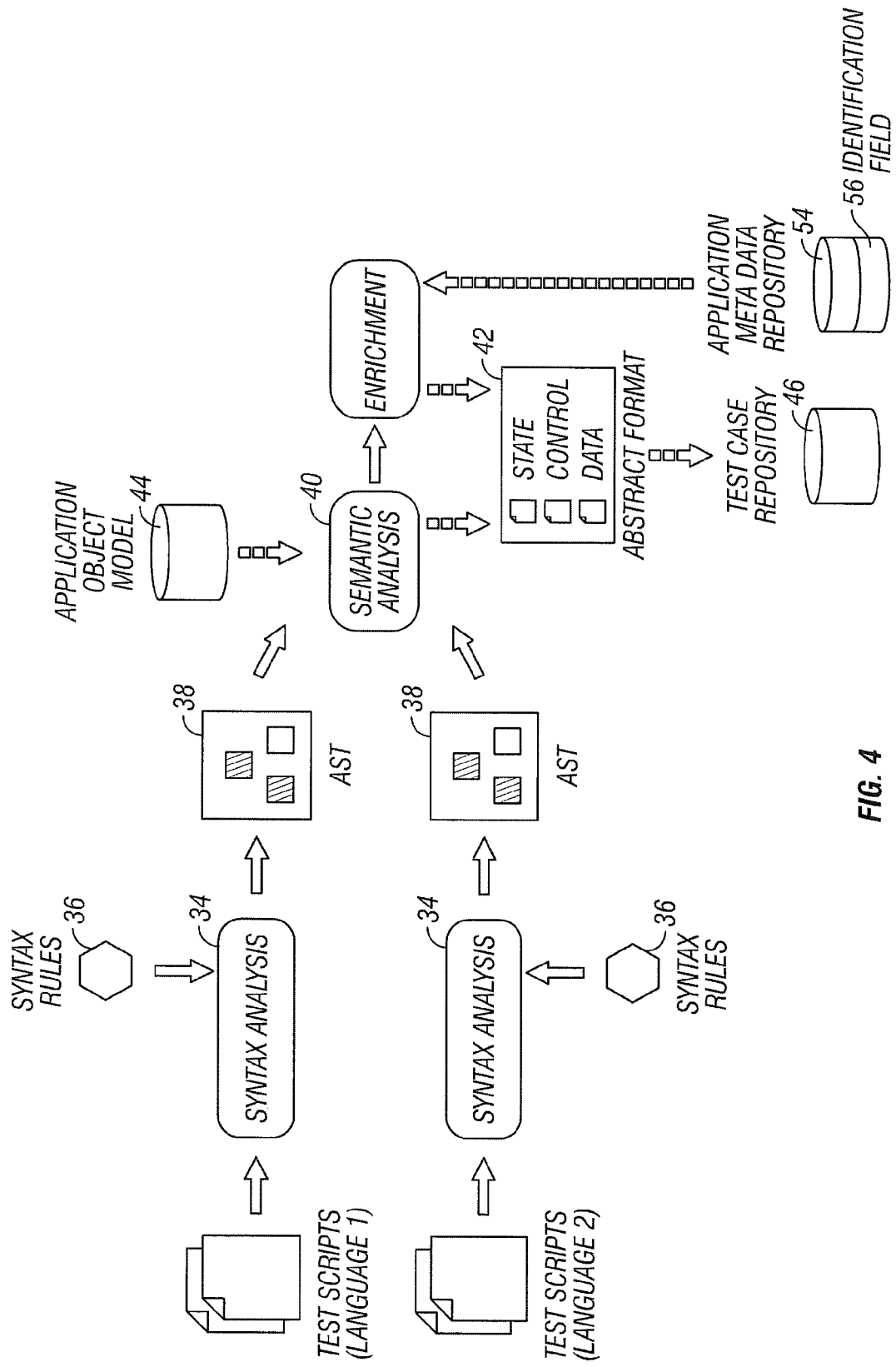
FIG. 4 is a schematic diagram illustrating one embodiment of test case import utilized with the present invention.
Figure 5:
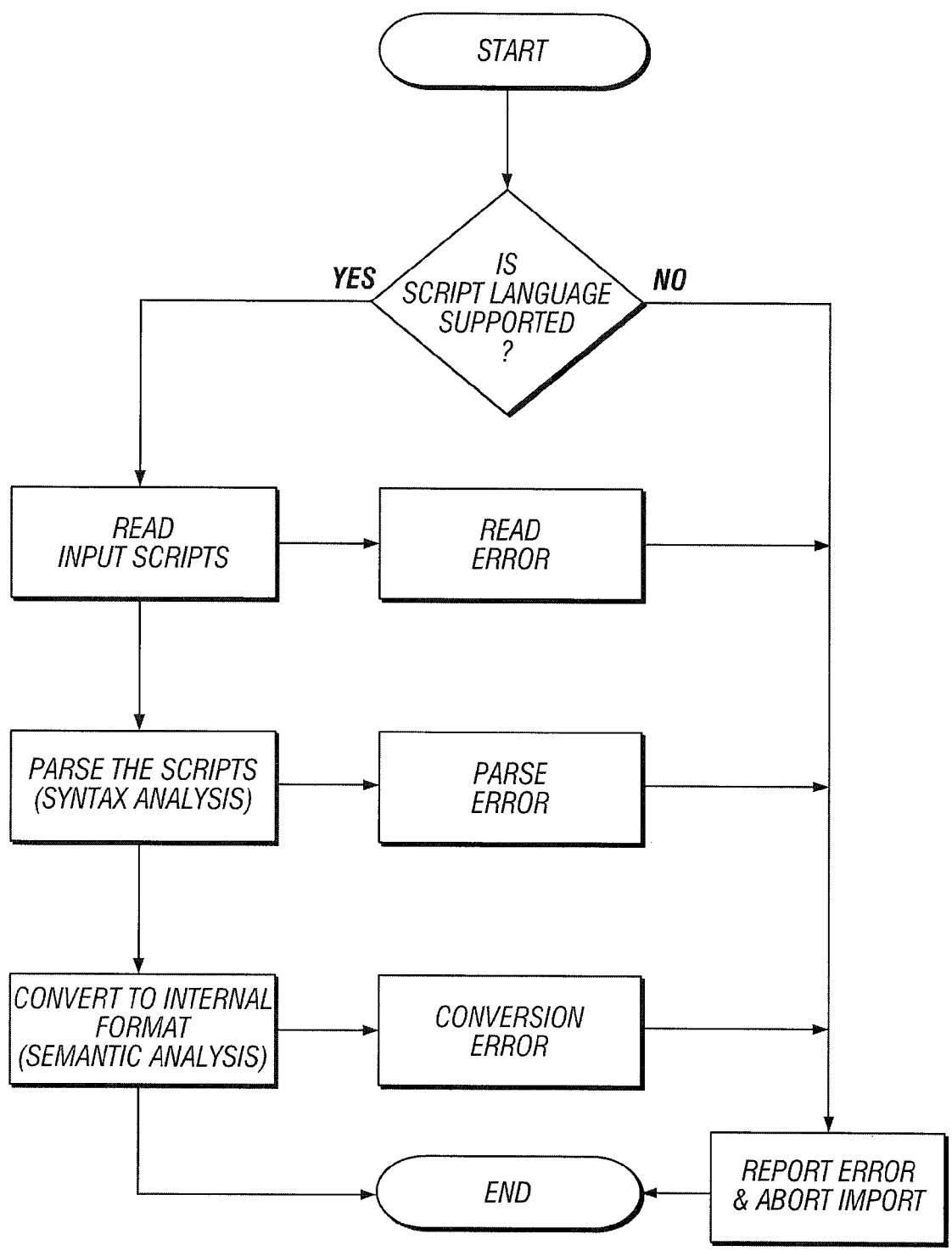
FIG. 5 is a flowchart illustrating one embodiment of import process utilized with the present invention.

As shown in FIG. 4, in one embodiment, a syntax analysis 34 can be implemented for incoming scripts. Syntax analyzer 34 can be implemented one for each scripting language. Syntax analyzer 34 can utilize rules of syntax analysis 36 that are specified in Extended Backus-Naur Form (EBNF). Syntax analysis can generate a parse tree in the form of an Abstract Syntax Tree (AST) 38. One embodiment of a method of handling scripts with the present invention is illustrated in the FIG. 5 flowchart.

In one embodiment, a semantic analysis 40 is implemented that converts the AST 38 to an abstract test case representation 42 based on an Application Object Model (AOM) 44. Semantic analysis 40 decomposes the test cases represented as an AST 38 into application state 16, external interaction sequences and input data.

Figure 6:
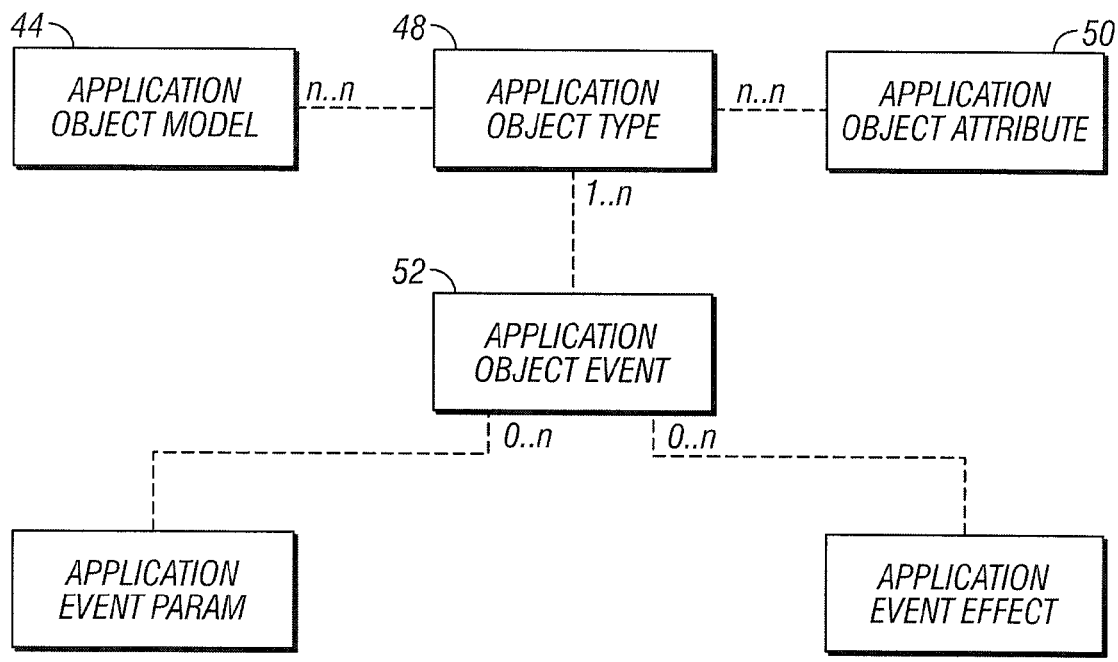
FIG. 6 is a schematic diagram illustrating an application object model that can be utilized with one embodiment of the present invention.
Figure 7:
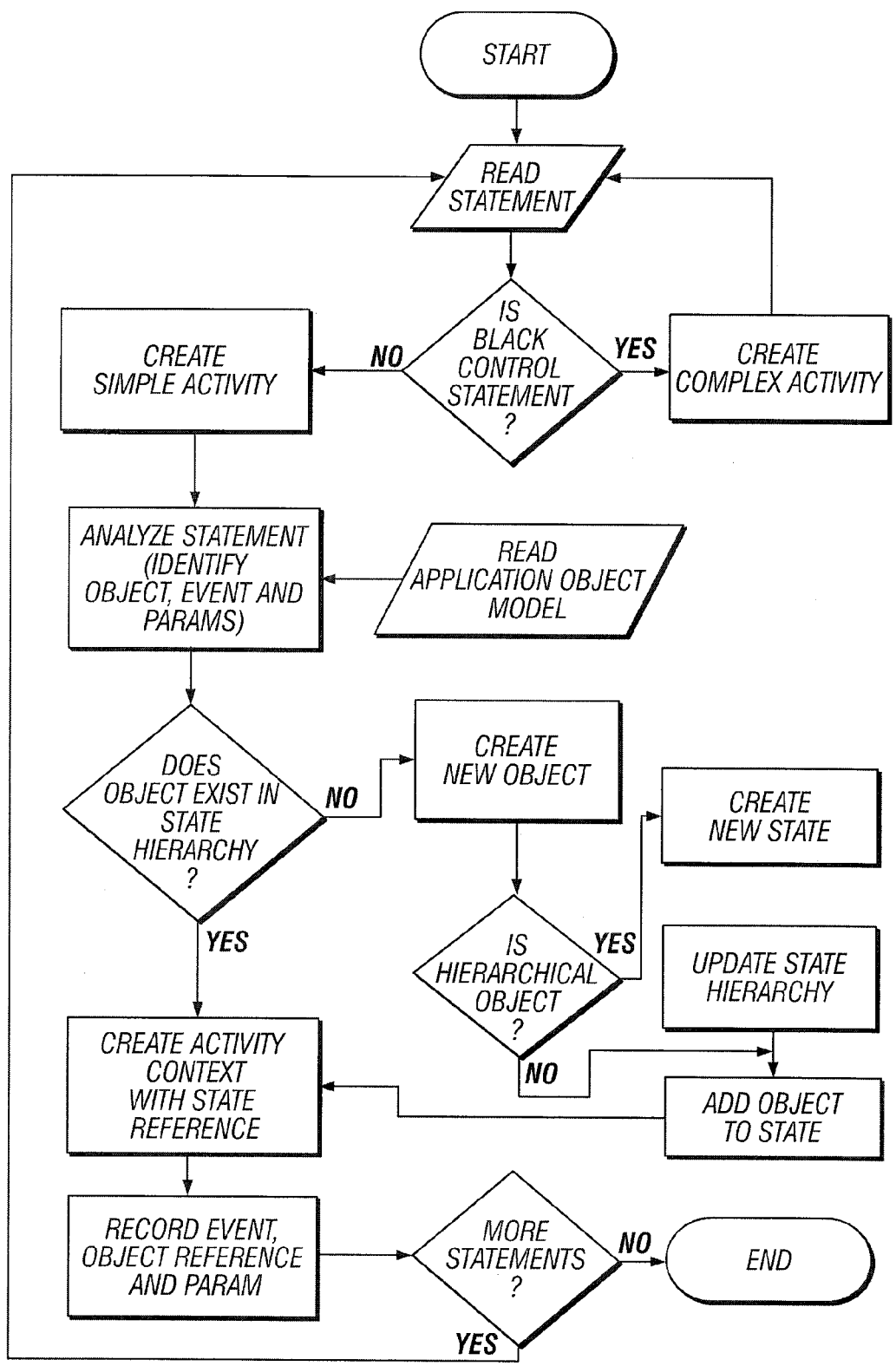
FIG. 7 is a flowchart illustrating one embodiment of semantic analysis that can be utilized with the present invention.

As illustrated in FIG. 6, AOM 44 can be a metadata representation for modeling application under test. Components of the metadata representation include, but are not limited to, application object type definitions 48 for application objects 24, attribute definitions 50 for each application object 24 type, definitions of methods and events 52 that are supported by each application object 24 type, definitions of effects of events 52 on an application state 16, and the like. One embodiment of a method of performing semantic analysis with the present invention is illustrated in the FIG. 7 flowchart.

Application object type definitions 48 can include additional categorization of each application object 24 type, and can be, (i) hierarchical, (ii) container and (iii) simple. The hierarchical object types are associated with an application state 16 of its own. Application object types 16 that can contain instances of other objects are container types. For example, a web page can be represented by a hierarchical object type and table within the web page by a container type. A label in the page is represented by a simple object type. The state associated with a hierarchical application object type 16 is a modal application state or a nonmodal application state. A modal application state restricts possible interactions to application object 24 instances available within a current application state 16. A dialog window for example restricts all user interactions to the current dialog window.

The effects of events 52 on an application state 16 capture one or more consequences of an event 52 to the application state 16. A consequence of an event 52 can be, creation of an instance of an object of a given type, deletion of an instance of an object type, modification of attributes of an existing object of type, selection of an instance of an object type, and the like.

Creation or selection of a hierarchical object type can result in formation of, a new application state 16, selection of the application state 16 associated with the object type, and the like.

In another embodiment, the abstract representation 14 of test cases 12 is enriched with information from an application metadata repository 54. The abstract representation 14 of test cases 12 can be enriched by extracting values for those attributes 26 of application objects 24 associated with the test cases 12 that are missing in the incoming test scripts. The enrichment of test cases 12 can decouple test cases 12 and their recording or authoring environments, and the like, and allow usage of attributes 26 that are stable within an application metadata representation 54. For example, an identification field within the application metadata repository 54 can be utilized to identify a given object 24 instead of a language dependent display label. This improves the reusability of the test case 12. Because different test execution environments can use different attributes 26 to identify the same application object 24, such decoupling provides platform independence.

In one embodiment, application object attributes 26 and input data are separated from external interaction sequencing to provide automatic parameterization. By automatically separating the data from the test case scenario, the 10 system dramatically reduces the manual labor involved to parameterize the scripts. Using the application object model, input data associated with each event 52 is separated from the scenario definition. The same process is applied to storing the object attributes 26. The input data definition forms a nested table data type definition that is driven for the events 52 involved in the scenario, and object event definitions in the application object model. This allows any data sets that match this definition to be applied to the same set of scenarios.

Figure 8:
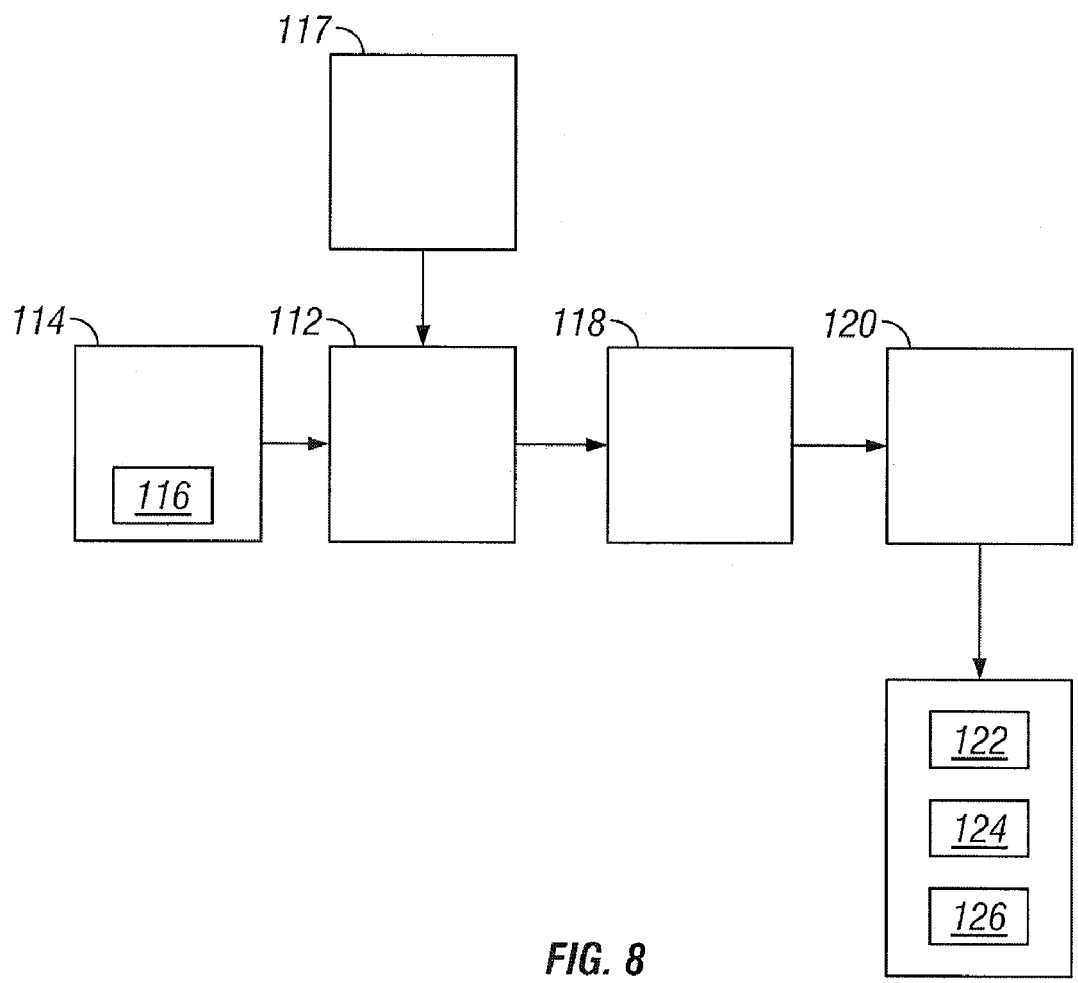
FIG. 8 is a schematic diagram illustrating a computer system that can be utilized to implement the FIG. 1 test case transformation embodiment of the present invention.

In another embodiment of the present invention, illustrated in FIG. 8, a computer system 110 includes a processor 112 coupled to a memory 114. Memory 114 stores program instructions 116 executable by processor 112 for converting test cases to an abstract representation that includes application state, external interaction sequences and input data. A database 116 stores abstract representation of test cases. A syntax analyzer 118 can be included for incoming scripts. Syntax analyzer 118 generates a parse tree in the form of an Abstract Syntax Tree (AST) 120.

Logic 122 is provided to implement semantic analysis and convert AST 120 to an abstract test case representation based on an Application Object Model (AOM). Logic 124 enriches the abstract test case representation with information from an application metadata repository. Logic 124 separates application object attributes and input data from external interaction sequencing to provide automatic parameterization.

Figure 9:
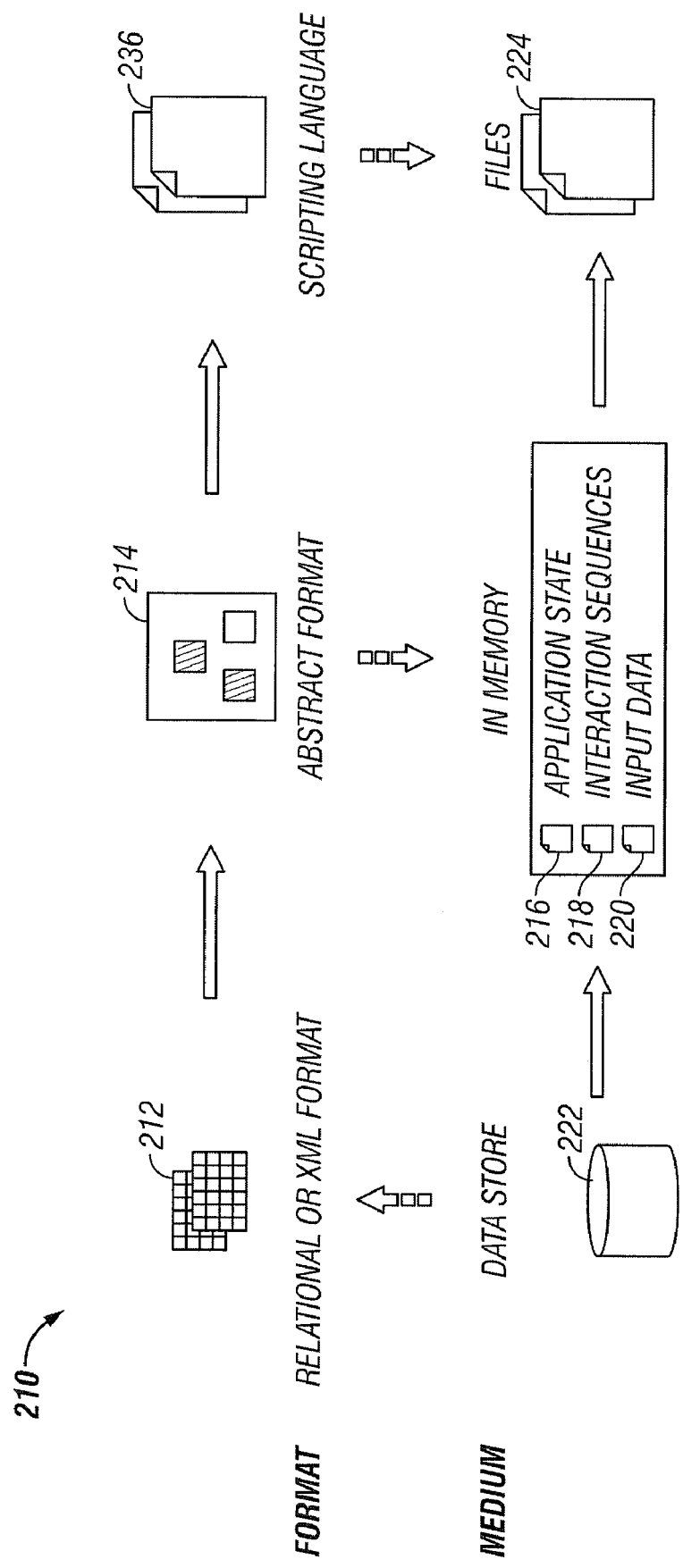
FIG. 9 is a schematic diagram illustrating one embodiment of a test case conversion embodiment of the present invention.
Figure 10:
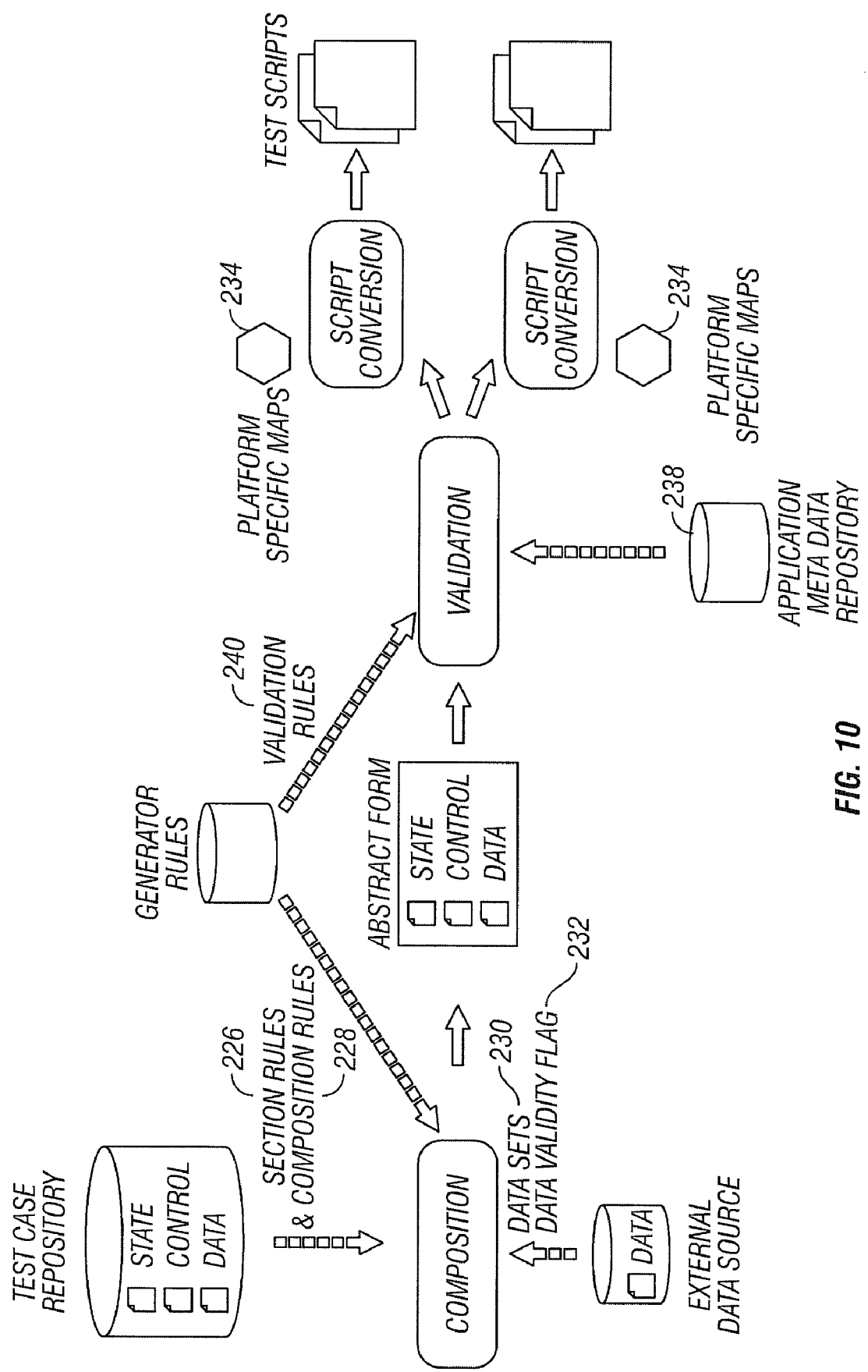
FIG. 10 is a schematic diagram illustrating one embodiment of a test case conversion embodiment of the present invention utilizing composition, an abstract form and validation.

In another embodiment of the present invention, illustrated in FIGS. 9 and 10, methods and systems 210 are provided for generating test cases 212. The test cases 212 are generated from an abstract representation 214 that includes application states 216, external interaction sequences 218 and input data 220 of test cases from data stores 222. Test cases 212 are produced that are then validated. Test cases 212 are converted to test scripts 224. A variety of data stores 222 can be utilized including but not limited to, a relational database management system, an XML database management system, file system, and the like.

It will be appreciated that application states 216 can be the same as application states 26.

In one embodiment, rules 226 are provided for the selection of components of test case definition, namely application states 216, external interaction sequences 218 and input data 220, as well as rules for data driven test case generation 228. The selection rules 226 can be specified using query languages including but not limited to, SQL, Xquery, API called from code written in a programming language, and the like. The use of query languages allows test cases to be generated from live customer data.

In one embodiment of the present invention, generation of test case 212 includes composing the test case 212 as dictated by the input data set 220 for a test case 212. Multiple datasets 230 can be provided for at least a portion, or all, of the input data set 220 for a test case 212. This results in a generation of multiple test cases 212 or external interaction sequences repeated within a loop control structure for each dataset 230. Use of multiple datasets 230, for a portion of the input data 220, results in the interaction sequences corresponding to this portion of input data repeated within loop control structure such as a while loop.

In one embodiment, each element of input data 220 is flagged as valid or invalid using a data validity flag 232. The presence of a validity flag 232 in the input data 220, that is different from the one corresponding to the input data 220 when the test cases 212 were recorded or authored, results in the generation step including appropriate interaction sequences for exception handling. For example, a test case that was stored in the abstract representation 214 can have normal interaction sequence 218 when the valid input data sets 220 are provided. The abstract representation also can contain interaction sequence 218 to be followed in the case of an exception condition such invalid data entry. The generator when generating the test case 212 from this abstract representation along with invalid input data will create a test case which includes interaction sequence 218 for exceptional situation rather than the normal interaction interaction sequence.

The generated test cases 212 can be validated against an external application meta data repository 238. The behavior of the validation can be controlled through additional validation rules 240.

The conversion of test cases 212 from an internal representation to a scripting language can be through platform specific mapping 234. The platform specific mappings include language mappings and other environment mappings. The language mapping used can map external interactions 218, captured as events on an application object, to appropriate statements in the scripting language 236. More than one language mapping can be provided at the same time. This allows generation of test scripts for multiple test execution environments. Additional environment mappings are provided to support additional platform independence. For example, if an application under test uses a third party report writer, the test cases can be represented using a generic report writer object and mappings for the specific report writer can be provided through the environment maps. This level of support can be extended to any level of underlying platform.

Figure 11:
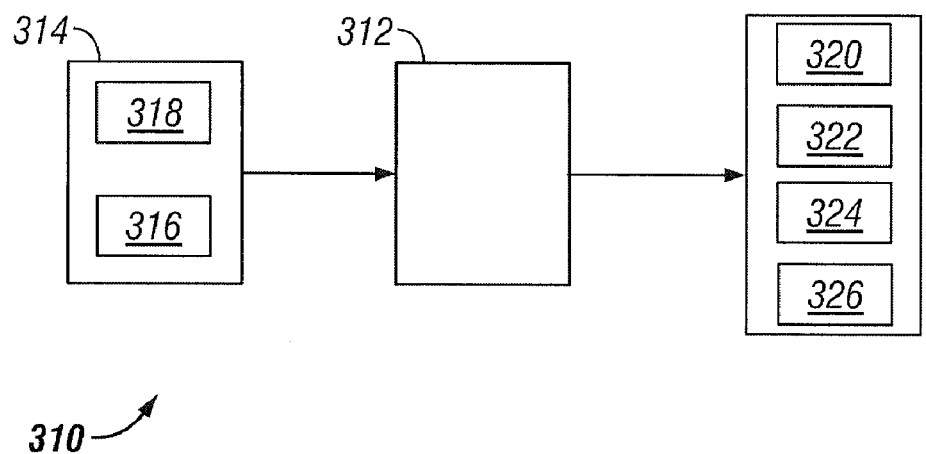
FIG. 11 is a schematic diagram illustrating a computer system that can be utilized to implement the FIGS. 9 and 10 test conversion embodiments.

In another embodiment of the present invention, as illustrated in FIG. 11 a computer system 310 is provided that includes a processor 312 and a memory 314 coupled to processor 310. Memory 314 stores rule-based generation of test cases 316 from an abstract representation 318. Abstract representation 318 includes application states, external interaction sequences and input data of test cases from data stores to produce test cases. Logic 320 validates the test cases. Logic 322 is provided for converting the test cases to test scripts.

Logic 320 provides that components of a test case definition, namely application states, external interaction sequences and input data, are consistent with each other and with an application object model. Logic 320 can be external validation logic. The external validation logic can include steps that validate a generated test case against an application metadata repository.

Computer system 310 can also include logic 324 that provides rules for selection of components of test case definition, namely application states, external interaction sequences and input data; rules for data driven test case generation. Computer system 310 can also include logic 326 that provides data driven test case generation. Logic 326 can compose the test case as dictated by the input data.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is

1. A method for transforming test cases that are converted from a source test script to an abstract representation and storing abstract representation of test cases into a database system, comprising:
    importing at least one test case written in one or more scripting language;
    converting the at least one imported test case to an abstract representation using semantic analysis without changing or deleting an original test case of the at least one imported test case based on an application object model, the abstract representation having at least three separate components including an application state, external interaction sequences and input data, where the application object mode is a metadata representation for a modeling application under test and includes components selected from application object type definitions for application objects, attribute definitions for each application object type, definitions of methods and events that are supported by each application object type and definitions of effects of events on an application state;
    storing the abstract representation into the database system; and
    generating at least one platform-specific test script based on the abstract representation stored in the database system using a platform-specific mapping, the platform-specific mapping including a language mapping and an environmental mapping, the at least one platform-specific test script provides interoperability between automation tools and cross environment portability of the at least one imported test case.

2. The method of claim 1, wherein the at least one application state comprises a representation of a runtime snapshot of the application while under test.

3. The method of claim 2, wherein the at least one application state comprises a set of application objects, attributes of the application objects, and values of the attributes.

4. The method of claim 2, wherein the at least one application state is a plurality of application states, and the plurality of application states are arranged in a hierarchical manner.

5. The method of claim 2, wherein the database system is a relational database management system.

6. The method of claim 2, wherein the database system is an extensible markup language (XML) database management system.

7. The method of claim 2, wherein the at least one scripting language is at least one of a typed programming language or an untyped programming language used for at least one of recording or authoring test cases.

8. The method of claim 2, wherein the at least one external interaction sequences comprises a representation of events invoked by external agents on the set of application objects.

9. The method of claim 8, wherein at least one external agent is at least one of a human agent or a software agent.

10. The method of claim 8, wherein the at least one interaction sequence comprises at least one flow control structure for capturing at least one of a sequential interaction, a concurrent interaction, a looping interaction, or a conditional interaction.

11. The method of claim 2, further comprising:
    implementing at least one imported syntax analyzer for the at least one test case.

12. The method of claim 11, wherein a distinct syntax analyzer is implemented for each scripting language used in each test case.

13. The method of claim 12, wherein the at least one syntax analyzer comprises rules of syntax analysis that are provided in Extended Backus-Naur Form.

14. The method of claim 12, further comprising generating at least one parse tree in the form of an Abstract Syntax Tree using the at least one syntax analyzer.

15. The method of claim 2, wherein the semantic analysis is used to convert an Abstract Syntax Tree to the abstract representation based on an Application Object Model.

16. The method of claim 15, wherein the semantic analysis is used to decompose the Abstract Syntax Tree into the at least one application state, the at least one external interaction sequences and the input data.

17. The method of claim 15, wherein the Application Object Model comprises a metadata representation of the application.

18. The method of claim 17, wherein the metadata representation comprises object type definitions for application objects.

19. The method of claim 18, wherein the object type definitions comprise hierarchical object types, container object types, and simple object types.

20. The method of claim 19, wherein each hierarchical object type-is associated with a distinct application state; and wherein each container object type comprises an application object type which is configured to contain instances of other application objects.

21. The method of claim 20, wherein the state associated with a hierarchical application object type is at least one of a modal application state or a nonmodal application state.

22. The method of claim 21, wherein the modal application state is configured to restrict possible interactions with application object instances available within a current application state.

23. The method of claim 19, wherein the effects of events on the at least one application state capture at least one consequence of the events to the application state.

24. The method of claim 23, wherein the at least one consequence of an event comprises at least one of creation of a new object instance of a given type, deletion of an object instance of a given type, modification of attributes of an existing object instance, or selection of an instance of an object type.

25. The method of claim 24, wherein the creation of a new object instance for a hierarchical object comprises creation of a new application state.

26. The method of claim 24, wherein the selection of an instance of an object type that is hierarchical comprises selection of the application state associated with the instance.

27. The method of claim 17, wherein the metadata representation comprises attribute definitions for each type of application object.

28. The method of claim 17, wherein the metadata representation comprises definitions of a plurality of methods and events that are supported by each type of application object.

29. The method of claim 17, wherein the metadata representation comprises definitions of a plurality of effects of events on an application state.

30. The method of claim 2, further comprising:
enriching the abstract representation based on information from an application metadata repository.

31. The method of claim 30, wherein enriching the abstract representation comprises extracting values for attributes of application objects associated with the at least one test case that are missing.

32. The method of claim 30, wherein enriching the abstract representation comprises decoupling the at least one imported test case from at least one of an associated recording environment or an associated authoring environment.

33. The method of claim 30, wherein enriching the abstract representation provides attributes that are stable within an application metadata representation.

34. The method of claim 33, wherein at least one application object is identified by an identification field within the application metadata repository.

35. The method of claim 33 wherein the identification field provides platform independence of the abstract representation.

36. The method of claim 35, wherein enriching the abstract representation provides a representation of test cases that is independent of any particular test execution environment.

37. The method of claim 2, further comprising:
separating application object attributes and input data from external interaction sequencing to provide automatic parameterization.

38. A system for transforming test cases that are converted from a source test script to an abstract representation and storing abstract representation of test cases into a database system, comprising:
a processor for importing test cases written in one or more scripting languages;
logic that converts at least one imported test case to an abstract representation using semantic analysis without changing or deleting an original test case of the at least one imported test case based on an application object model, the abstract representation including an application state, external interaction sequences and input data, where the application object model is a metadata representation for modeling application under test and includes components selected from application object type definitions for application objects, attribute definitions for each application object type, definitions of methods and events that are supported by each application object type and definitions of effects of events on an application state, storing the abstract representation into the database system, logic that generates at least one platform-specific test script based on the abstract representation stored in the database system using a platform-specific mapping, the platform-specific mapping including a language mapping and an environmental mapping.

39. The system of claim 38, wherein the at least one imported test case is converted using a syntax analyzer.

40. The system of claim 38, wherein the semantic analysis is configured to convert an abstract syntax tree to the abstract representation based on an Application Object Model.

41. The system of claim 38, further comprising:
a third set of instructions which, when executed by the processor, configures the processor to enrich the abstraction representation to provide a representation of the at least one imported test case that is independent of any particular test execution environment.

42. A computer system for transforming test cases that are converted from a source test script to an abstract representation and storing abstract representation of test cases into a database system, comprising:
a processor;
a memory coupled to the processor, the memory storing at least one test case written in one or more scripting language, the at least one test case that is converted to an abstract representation through semantic analysis without changing or deleting an original test case of the at least one test case based on an application object model, the abstract representation including an application state, external interaction sequences and input data, where the application object model is a metadata representation for modeling application under test and includes components selected from application object type definitions for application objects, attribute definitions for each application object type, definitions of methods and events that are supported by each application object type and definitions of effects of events on an application state, the memory storing at least one platform-specific test script generated based on the abstract representation stored in the database system by use of a platform-specific mapping, the platform-specific mapping including a language mapping and an environmental mapping.

43. The system of claim 42, wherein the first set of instructions comprises a syntax analyzer.

44. The system of claim 43, wherein the syntax analyzer is configured to generate a parse tree in the form of an Abstract Syntax Tree based on the at least one test case.

45. The system of claim 44, wherein the first set of instructions, when executed by the processor, further configures the processor to convert the Abstract Syntax Tree to the abstract representation based on an Application Object Model.

46. The system of claim 42, wherein the first set of instructions, when executed by the processor, further configures the processor to enrich the abstract representation using information from an application metadata repository.

47. The system of claim 42, wherein the first set of instructions, when executed by the processor, further configures the processor to separate the attributes and the input data from the at least one external interaction sequence to provide automatic parameterization.

* * * * *